US009836571B2

(12) United States Patent
Hathaway et al.

(10) Patent No.: US 9,836,571 B2
(45) Date of Patent: Dec. 5, 2017

(54) APPLYING RANDOM NETS CREDIT IN AN EFFICIENT STATIC TIMING ANALYSIS

(71) Applicant: International Business Machines Corporation, Armonk, NY (US)

(72) Inventors: David J. Hathaway, Underhill, VT (US); Ronald D. Rose, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 14/747,611

(22) Filed: Jun. 23, 2015

(65) Prior Publication Data

US 2016/0378901 A1 Dec. 29, 2016

(51) Int. Cl.
*G06F 17/50* (2006.01)

(52) U.S. Cl.
CPC ........ *G06F 17/5081* (2013.01); *G06F 17/504* (2013.01); *G06F 17/5036* (2013.01)

(58) Field of Classification Search
None
See application file for complete search history.

(56) References Cited

U.S. PATENT DOCUMENTS

| | | | |
|---|---|---|---|
| 5,636,372 A | 6/1997 | Hathaway et al. | |
| 6,795,951 B2 | 9/2004 | Hathaway et al. | |
| 7,181,711 B2 * | 2/2007 | Foreman | G06F 17/5031 716/113 |
| 7,251,797 B2 * | 7/2007 | Becer | G06F 17/5036 716/113 |
| 7,562,323 B1 * | 7/2009 | Bai | G06F 17/5036 703/2 |
| 7,761,826 B1 * | 7/2010 | Thanvantri | G06F 17/5036 716/108 |

(Continued)

FOREIGN PATENT DOCUMENTS

| | | |
|---|---|---|
| EP | 0677813 A2 | 10/1995 |
| WO | 2008005622 A2 | 1/2008 |
| WO | 2009035813 A1 | 3/2009 |

OTHER PUBLICATIONS

Battari, Obulesu, et al; "On-Chip Crosstalk Delay and Noise Analysis Using Static Timing Analysis on Nano Time Ultra in VLSI Circuits", Global Journal of Advanced Engineering Technologies, ISSN (Online): 2277-6370, pp. 166-172.

(Continued)

*Primary Examiner* — Leigh Garbowski
(74) *Attorney, Agent, or Firm* — Gibb & Riley, LLC; Steven J. Meyers

(57) ABSTRACT

A method may include: specifying a random nets credit (RNC) statistic for nets subject to random noise in a static timing analysis of an initial integrated circuit (IC) design; calculating an upper bound for a delta delay of each net using the RNC statistic; identifying each net with a delta delay that exceeds the upper bound; identifying all nets including fan-in and fan-out cones connected to each net that exceeds the upper bound and performing a higher accuracy timing analysis for all nets that are marked. Using the upper bound for each delta delay of the nets subject to ransom noise, the delta delay of each net subject to a non-random noise, and the delta delay for all identified nets, to adjust the initial IC design, to close timing and generate a final IC design.

15 Claims, 3 Drawing Sheets

(56) References Cited

U.S. PATENT DOCUMENTS

| | | | |
|---|---|---|---|
| 8,219,952 B2* | 7/2012 | Tehrani | G06F 17/5022 |
| | | | 716/113 |
| 2006/0112359 A1 | 5/2006 | Becer et al. | |
| 2006/0248485 A1 | 11/2006 | Foreman et al. | |
| 2009/0210839 A1 | 8/2009 | Buck et al. | |
| 2009/0235133 A1 | 9/2009 | Kapur et al. | |
| 2012/0239371 A1 | 9/2012 | Tehrani et al. | |
| 2016/0216316 A1* | 7/2016 | Kim | G06F 17/50 |

OTHER PUBLICATIONS

Chen, Pinhong, et al; "Switching Window Computation for Static Timing Analysis in Presence of Crosstalk Noise", in Proceedings of the 2000 IEEE/ACM International Conference on Computer-Aided Design, IEEE Press, 2000, pp. 331-337.

* cited by examiner

APPLYING RANDOM NETS CREDIT IN AN EFFICIENT STATIC TIMING ANALYSIS

BACKGROUND

The present disclosure relates to integrated circuit (IC) design and, more particularly, to a method, a system and a computer program product for performing a static timing analysis that incorporates the effects of coupled noise between neighboring nets of timing paths in the IC.

In conventional electronic design flow, a designer uses a suite of software design tools to progress from a high level of logical abstraction to a detailed physical representation of an integrated circuit (IC) design that is optimized for manufacture. After defining abstract behavior of the desired IC, the designer translates an abstract logical language to a discrete netlist of logic gates. Based on the netlist of logic gates, the designer uses a cell-based schematic capture tool to generate a bottom-up cell-based schematic of the IC design.

Following the schematic design phase, the cell-based schematic is used to assess the logical functionality of the IC design, but cannot provide an accurate estimate of performance metrics, e.g., timing delays, for a manufacturable IC design. An accurate estimate of the digital and analog performance metrics of the design requires a physical design, including a schematic-driven layout, that exactly places all circuit components and routes all interconnects to minimize timing delays.

Static timing analysis is a method of computing the expected timing delays of digital circuits and determining whether timing constraints required for correct circuit operation are satisfied without requiring computationally intensive simulation. Assessing the ability of a circuit to operate at a specific clock frequency requires the ability to estimate, during the iterative design process, the circuit's delay at many phases of the timing analysis. In particular, delay calculation and timing constraint checking are incorporated into the inner loop of timing analyzers during the placement and routing phases, i.e., the physical design phase, of an IC. While such delay calculations could, in theory, be performed using computationally intensive circuit simulations, in practice, an estimate of the timing delays is provided by methods of static timing analyses that provide reasonably accurate estimates of circuit timing delays.

Static timing analysis may be performed in either a block-based or a path-based manner. Block-based analysis is the most efficient, with a run time that is linear relative to the number of delay elements in the timing graph and computes, for each node in the graph, an arrival time that is the latest or earliest time at which a signal may arrive at the node considering all paths leading to the node. Path-based analyses trace and sum delays along each path through the timing graph or circuit, and determine whether timing constraints on the arrival time at the end of the path are satisfied. Because the number of paths through a circuit grows exponentially with the size of the circuit, path-based analysis is much more computationally expensive than block-based analysis.

Static timing analysis, as well as various other types of analysis of integrated circuit designs, must consider many potential effects. Many of these effects may be considered at different levels of accuracy, with computation costs that increase as the level of accuracy increases. In many cases analysis at a lower level of accuracy may be done in such a way that it produces a pessimist bound on the results that would be produced by the higher accuracy analyses. In such cases, if the potentially pessimistic result produced by a lower accuracy analysis shows that certain portions of the integrated circuit would function correctly, i.e., all timing constraints in those portions would be met in a static timing analysis, an analysis system may avoid employing the higher accuracy and higher computation cost analysis methods on those portions of the design that "passed" the lower accuracy analysis. This general approach may be referred to as variable-detail analysis, and is widely used in static timing analysis.

For example, an initial timing analysis may assume that the entire early and late paths leading to a timing test can vary independently. This can be pessimistic, because portions of those paths may be common, and cannot be both slow in the late mode path and fast in the early mode path. Common path pessimism removal (CPPR), as described in U.S. Pat. No. 5,636,372 which is incorporated into description in its entirety, is a computationally more expensive analysis that can identify these pessimistic cases and produced a more accurate and less pessimistic timing slack for particular timing tests. A variable-detail analysis may apply CPPR methods only to those tests for which the initial less expensive analysis indicated that the timing constraint was not met.

When there is a large amount of pessimism in a low accuracy analysis used as part of a variable-detail analysis system and a large increase in computational cost for the next higher accuracy analysis, it can be beneficial to introduce additional intermediate levels of analysis that can provide reduced pessimism over the low accuracy analysis with less cost than the next higher accuracy analysis.

The method of a static timing analysis can be extended to incorporate the effects of coupled noise on neighboring nets of timing paths in the physical design of the IC. Generally, a circuit will contain many timing paths, where each path extends from a source through a series of nets and gates to a sink. Each gate and net in the design may be included in many different timing paths. A particular net, called a victim net, can be affected by noise from a neighboring net, called an aggressor net. Coupling, e.g., capacitative or inductive coupling, between the aggressor and the victim nets can cause a switching aggressor net to induce an unintentional current, i.e., noise, in the victim net.

When switching times for the aggressor and the victim nets overlap, coupled noise can increase the timing delay, if the aggressor and victim are switching logic levels in opposite directions, and decrease the timing delay, if the aggressor and victim are switching logic levels in the same direction. These increases or decreases in delay due to noise are referred to as delta delays. However, aggressors and victims generally do not switch with every timing cycle and aggressor-switching times may not overlap with victim switching times due to, for example, different triggering paths. It is therefore pessimistic to include the delta delays of all nets in a timing analysis. Methods exist to consider only the N largest delta delays, but they require expensive path-based analysis or multiple parallel block based analyses.

There remains a need to decrease the pessimism of a static timing analysis that estimates the effects of coupled noise on neighboring nets in timing paths of an IC design.

SUMMARY

In an embodiment of the disclosure, a method of performing a static timing analysis, using a random nets credit (RNC) method and a more computationally intensive timing analysis method may include specifying a random nets credit (RNC) statistic for a number of nets subject to a coupled random noise in a static timing analysis of an integrated circuit (IC). The method may also include performing an initial noise-free static timing analysis of the integrated circuit design that include only delta delays for always included nets. The method may further include calculating an upper bound for a delta delay of each of the number of nets using the RNC statistic. The method may yet further include identifying each of the number of nets with a delta delay that exceeds the upper bound. The method may yet further include marking all nets, including fan-in cones and fan-out cones of nets, connected to each of the number of nets that exceeds the upper bound. Finally, the method may include performing a higher accuracy timing analysis, based on a physical design, for all of the nets that are marked.

In another embodiment of the disclosure, a method of performing a static timing analysis, using a random nets credit (RNC) method and a more computationally intensive timing analysis method may include specifying a random nets credit (RNC) statistic for a number of nets subject to a coupled random noise in a static timing analysis of an integrated circuit (IC). The method may also include calculating a delta delay for each of the number of nets subject to the coupled random noise based on a slack of the net and the RNC statistic. The method may yet further include performing a timing analysis of each net subject to a non-random noise to yield a delta delay. The method may yet further include calculating an excess delta delay, edD, for each of the number of nets based on the calculated delta delay, the slack of each net, and the RNC statistic. The method may yet further include propagating a value of one of: a sum of edDs along each path and a maximum edD along each path. The method may yet further include computing a maximum path delta delay at each of the number of nets based on the propagated value. Finally, the method may include calculating a lower bound slack for each of the number of nets based on a difference between the slack of each number of nets and the maximum path delta delay.

In yet another embodiment of the disclosure, a system that performs a static timing analysis of an integrated circuit (IC) using a random nets credit (RNC) method to analyze a number of nets subject to a coupled random noise within the IC may comprise: a memory that stores an integrated circuit (IC) design. The system may also comprise at least one processor that performs computer readable instructions to: specify a random nets credit (RNC) statistic for a number of nets subject to a coupled random noise in a static timing analysis of the IC design; perform an initial noise-free timing analysis of the IC design; calculate an upper bound for a delta delay of each of the number of nets by a calculation using the RNC statistic; identify each of the number of nets with a delta delay that exceeds the upper bound; mark all nets, including fan-in cones and fan-out cones of nets, connected to each of the number of nets that exceeds the upper bound; and perform a higher accuracy timing analysis for said all nets that are marked.

BRIEF DESCRIPTION OF THE DRAWINGS

The embodiments herein will be better understood from the following detailed description with reference to the drawings, which are not necessarily drawn to scale and in which.

DETAILED DESCRIPTION

Figure 1:
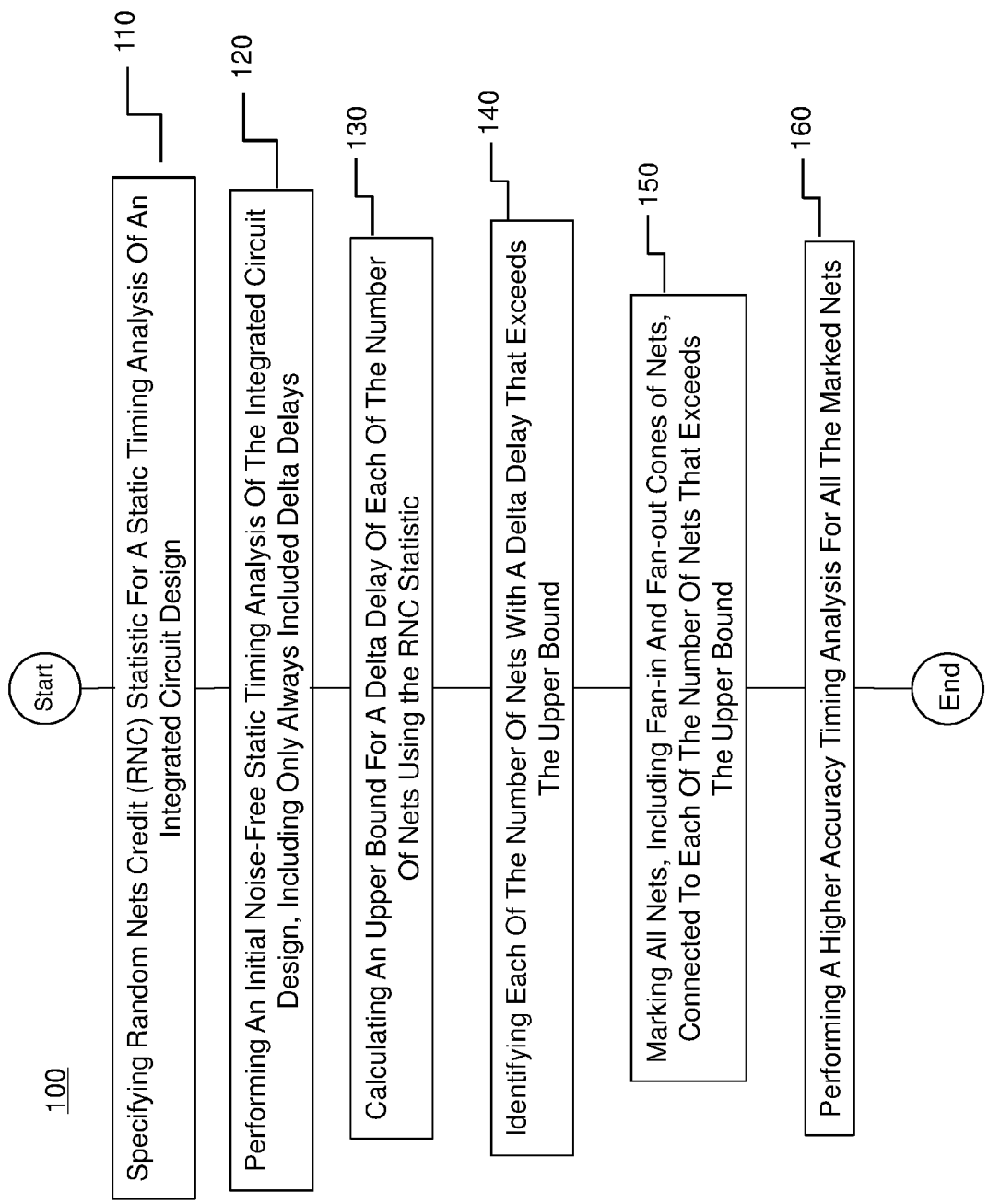
FIG. 1 is a flowchart diagram illustrating the calculation of delta delays impacted by noise in a timing analysis of embodiments herein.

In a conventional static timing analysis, timing paths may include many aggressor and victim nets that are impacted by coupled noise. By assuming that every aggressor impacts a delay along a timing critical path in the same cycle and increases that delay occurring with each logical transition in each victim net, the conventional static timing analysis is unduly pessimistic.

As stated above, there remains a need to decrease the pessimism of a static timing analysis that estimates the effects of coupled noise on neighboring nets in timing paths of an IC design.

Timing slack is defined as the amount of time margin by which a timing constraint is met. For example, a setup test requiring a signal to arrive no later than time 100 would have a slack of 20 if the actual signal arrived at time 80, and a hold test requiring that a signal arrive no earlier than time 10 would have a slack of 5 if the signal actually arrived at time 15. A negative slack indicates the possibility of a timing failure of the path. Because noise may alter the delays of circuits along a path, accurate timing analysis must include noise-induced delta delays. All possible delay-altering events along a path are extremely unlikely to occur in the same cycle, because aggressor signals will generally not switch with every timing cycle and aggressor-switching times may not overlap with victim switching times due to, for example, different triggering paths. Conventional noise analysis applies pessimistic assumptions, for example, simultaneous switching of aggressor and victim nets and opposite switching logic levels for the aggressor and victim nets to every noise event, which may cause all possible noise-induced delay changes along a path to be added, and can result in tens of thousands of failing slacks on otherwise statistically acceptable timing delays. Many of these failing slacks may be considered false due to this pessimism.

Conventional timing analyses "filter" or screen out small coupling capacitors and noise events with small delay impacts to reduce the computational load. However, this approach can lead to timing failures when, for example, data buses and coupled nets act in phase. In paths with slacks close to zero, i.e., those barely meeting their timing constraints, even noise induced through small coupling capacitances may be sufficient to create a timing failure. Thus, means are needed to select sets of noise events to consider in timing analysis based on the likelihood that all events in the set will occur together, rather than simply on the size of the coupling capacitances.

One method of reducing pessimism caused by noise events in a static timing analysis may include performing a timing analysis, which includes only the largest delta delays due to random noise events along each path. Random events are those whose switching times and cycles are not correlated with each other. In contrast, regular events are those among which correlation is expected, such as clock signals, which generally switch in every cycle, and signals in data buses that are fed by structurally similar groups of circuits which are likely to switch together. The largest random noise events may be characterized by the size of their delta delays and the probability of their occurrences in a single victim path, containing multiple noise coupled nets, in any given clock cycle. An analysis may consider only the largest N delta delays, or it may also include a portion of the next M largest delta delays. Values of N and M are chosen through engineering judgment and experience with previous designs, to ensure that enough of the impact of noise on delay is included in the analysis to reduce the probability of having the analysis miss a timing fail that could occur in actual hardware to an acceptably low level. These N and M values may be constant numbers (e.g., 3 and 4) some fraction of the path length, e.g., 0.1* nets_in_path, and 0.15* nets_in_path, the largest of these two values, or otherwise adaptively determined.

Because each net will, in general, be part of many timing paths, an analysis considering only the largest delta delays along each path must be performed using either an expensive path-based analysis, or by an also expensive block-based propagation of multiple timing values, as taught in U.S. Pat. No. 6,795,951, which is incorporated into this description in its entirety. The cost of such an analysis can be reduced by performing a variable-detail analysis, in which a first pessimistic block-based analysis is performed including all the noise-induced delta delays. The more expensive path-based analysis or multiple propagation block-based analysis is then performed only for those paths, which failed, i.e., have a negative slack, in the initial pessimistic analysis. The slack improvement between the pessimistic analysis and the subsequent path-based or multiple propagation block-based analysis may be referred to as a "random nets credit" (RNC). However, because a given path may have many more delta delays than, e.g., the N and M values chosen for the number of delta delays to include for each path, the initial pessimistic analysis used in this variable detail analysis may be very pessimistic, unnecessarily requiring the more expensive path-based or multiple propagation block-based analysis of a large number of paths that are actually not failing. The term RNC will hereafter refer to any static timing analysis method that includes in the delay of each path a subset of the delta delays for the nets in the path, and an RNC (N, M) method will mean an analysis that includes the N largest and root sum square (RSS) of the next largest M delta delays for each path.

In general, an initial noise-free static timing analysis of an IC design may identify all timing paths and nets with positive noise-free slack. In a subsequent noise analysis, each of these timing paths of the IC design may contain a number of aggressors and victim nets, where the delta delays to be included in the analysis, e.g., the largest N delta delays and the RSS of the next largest M delta delays, caused by aggressors' actions on victim nets, may be combined along the timing path to yield a single combined delta delay for the path. Thus, the single combined delta delay may be viewed as a combination of delta delays resulting from a combination of aggressors in the timing path.

There exist a variety of means for calculating delta delays in a static timing analysis, e.g., refined delta delay calculations and path-based analysis. For example, IBM® Statistical Analysis Tools including: ETCoupling; EinSI; and EinsNoise, available from IBM Corporation, Armonk, N.Y., USA, may model coupling capacitors. For example, ETCoupling may model a coupling capacitor as a larger grounded capacitor by using K factors, while PDQ, a more computationally intensive model, used by EinSI and EinsNoise, may more accurately model the coupling capacitor. In general, one assumes that the less accurate models and methods are bounding, and thus, pessimistic.

In general, some of the timing paths of an IC design may include a set of "always included" aggressors. That is, aggressors known to switch often or likely to switch logic levels when overlapping with a victim's switching times may produce "non-random" delta delays in the timing path. Such "non-random" delta delays are inappropriate for the RNC method, which requires random timing delays. The timing paths of the IC design may also include a set of "random" aggressors, i.e., aggressors whose actions are random with respect to the victims' switching times.

In general, the application of an RNC method to timing paths including nets subject to random noise may assume that delta delays are positive, i.e., a late mode. An extension of the application of the RNC method to timing paths including nets subject to random noise may also assume that that delta delays are positive and/or negative, i.e., an early mode, by using the absolute value of the positive or negative delta delays, respectively. In various applications of the RNC method to timing paths including nets subject to random noise, excess delta delays may be applied to nets subject to random noise, forcing their timing delays to be positive.

An RNC timing analysis method will produce a larger (or less negative) slack for each timing constraint, as compared to an analysis that includes all delta delays for each path. If the RNC analysis is used in a variable detailed analysis as a relatively pessimistic analysis before some other more expensive analysis, e.g., CPPR, the resulting reduction in the number of negative slack paths reduces the number of endpoints to which CPPR must be applied. On the other hand, if application of a computationally intensive exact method of path-based analysis is contemplated, then the larger lower bound provided by the RNC method reduces the number of paths that may be analyzed.

An upper bound of the delta delay of nets subject to random noise may also be calculated based on the following assumptions and reasoning. Using an RNC (N, M) method, if one assumes that all of the delta delays of each of the nets subject to random noise in a single timing path of the IC were the same, e.g., dD, the total or maximum path delta delay attributed to all of the nets subject to random noise in the single path would be:

$$\text{max\_path\_dD} = dD \times (N + \text{sqrt}(M)).$$

Consequently, any timing path with nets subject to random noise, where the slack is greater that the value of max_path_dD would pass the timing analysis and no further analysis would be needed.

It follows that all nets subject to random noise would pass, if for every net(X):

$$dD(X) < \text{slack}(X)/(N + \text{sqrt}(M)),$$

where slack(X) is the slack determined from a noise-free static timing analysis. This provides a calculated upper bound for the delta delay, dD(X), of the net(X). Thus, an RNC (N, M) method of timing analysis needs only to be used for paths containing at least one net having delta delays larger than that of the upper bound, dD(X) described above.

Each of these nets X, i.e., those having a delta delay larger than that of the calculated upper bound, may appear in any number of paths including the fan-in cones and fan-out cones of nets connected to the net(X), which has a delta delay larger than the upper bound dD(X). Thus, a more computationally intensive path-based analyses need only be performed for the paths including the fan-in cones and fan-out cones of nets connected to the net(X), i.e., those cones of nets approaching net(X) and going forward from net(X), respectively.

As described above, the timing paths impacted by noise may include: nets associated with "non-random" delta delays produced by "always included" aggressors known to switch often or likely to switch logic levels when overlapping with a victim's switching times, and nets associated with "random" delta delays produced by aggressors' actions that are random with respect to the victim's switching times. The delta delays for the "always included" nets are included in the initial "noise-free" timing analysis used to determine the dD(X) bounds.

FIG. 1 illustrates an exemplary method 100 of performing a static timing analysis, using a random nets credit (RNC) method and a more computationally intensive timing analysis method, including: specifying a random nets credit (RNC) statistic for a number of nets subject to a coupled random noise in a static timing analysis of an integrated circuit (IC) 110; performing an initial noise-free static timing analysis of the integrated circuit design that include only delta delays for "always included", e.g., clock and data bus, nets 120; calculating an upper bound for a delta delay of each of the number of nets using the RNC statistic 130; identifying each of the number of nets with a delta delay that exceeds the upper bound 140; marking all nets, including fan-in cones and fan-out cones of nets, connected to each of the number of nets that exceeds the upper bound 150; and performing a higher accuracy timing analysis, based on a physical design, for all of the nets that are marked 160.

In the exemplary method, above, the RNC statistic may comprise a maximum fraction of each net slack that creates an upper bound on the delta delay for each net that, if not exceeded by the delta delay of each net in the timing path, ensures that the timing path meets its timing constraint. In the exemplary method, above, the RNC statistic may comprise an RNC (N,M) statistic with the value N+sqrt(M), and the calculation of the upper bound for the delta delay of each of the number of nets may comprise dividing a corresponding slack of each of the number of nets determined from a noise-free timing analysis by the RNC (N, M) statistic.

In the exemplary method, above, the fan-in cones may comprise all predecessor nets in a path from a source to each one of the number of nets with a delta delay that exceeds the upper bound, and the fan-out cones may comprise all successor nets in a path from each one of the number of nets with a delta delay that exceeds the upper bound to a sink. In the exemplary method, above, performance of the higher accuracy timing analysis for all nets that are marked may include any of: refined delta delay calculations and path-based analyses based on a physical design. The exemplary method, above, may further include performing a timing analysis based on a physical design of each net subject to a non-random noise in the IC, to produce a delta delay. The exemplary method, immediately above, may further include using calculations of the upper bound for each delta delay of each of the number of nets subject to the coupled random noise, the delta delay of each net subject to the non-random noise, and the more accurate delta delay for all the nets that are marked, to adjust the initial IC design, to close timing, and to generate a final IC design.

Except for the most critical path of nets subject to noise in an IC design, the amount of slack may vary in the different nets along a path. The amount of delta delay that may be tolerated without exceeding what may be allocated to a single net in a path varies with the slack of the path, as determined by a noise-free timing analysis that includes delta delays only for the "always included" nets. The amount of delta delay above the allocated delta delay to a single net may represent the excess delta delay, edD, for the single net, where $$edD(X)=dD(X)-slack(X)/(N+sqrt(M)).$$

One may use the excess delta delay, edD, of each net in a path to calculate the lower bounds of path slacks that would be produced by a complete RNC (N,M) method for all paths through the net by:

path slack>−sum of edDs along a path; and path slack>−(N+sqrt(M))×max edD along path of edDs.

Both a max sum edDs along a path and a max edD along a path of edDs may be found by a simple block-based transversal. Nets for which this lower bound path slack is non-negative are guaranteed not to contribute to any failed timing constraints in a full RNC timing analysis, and may therefore be omitted from the portion of the design subject to a full RNC analysis in a variable detailed timing analysis approach.

Figure 2:
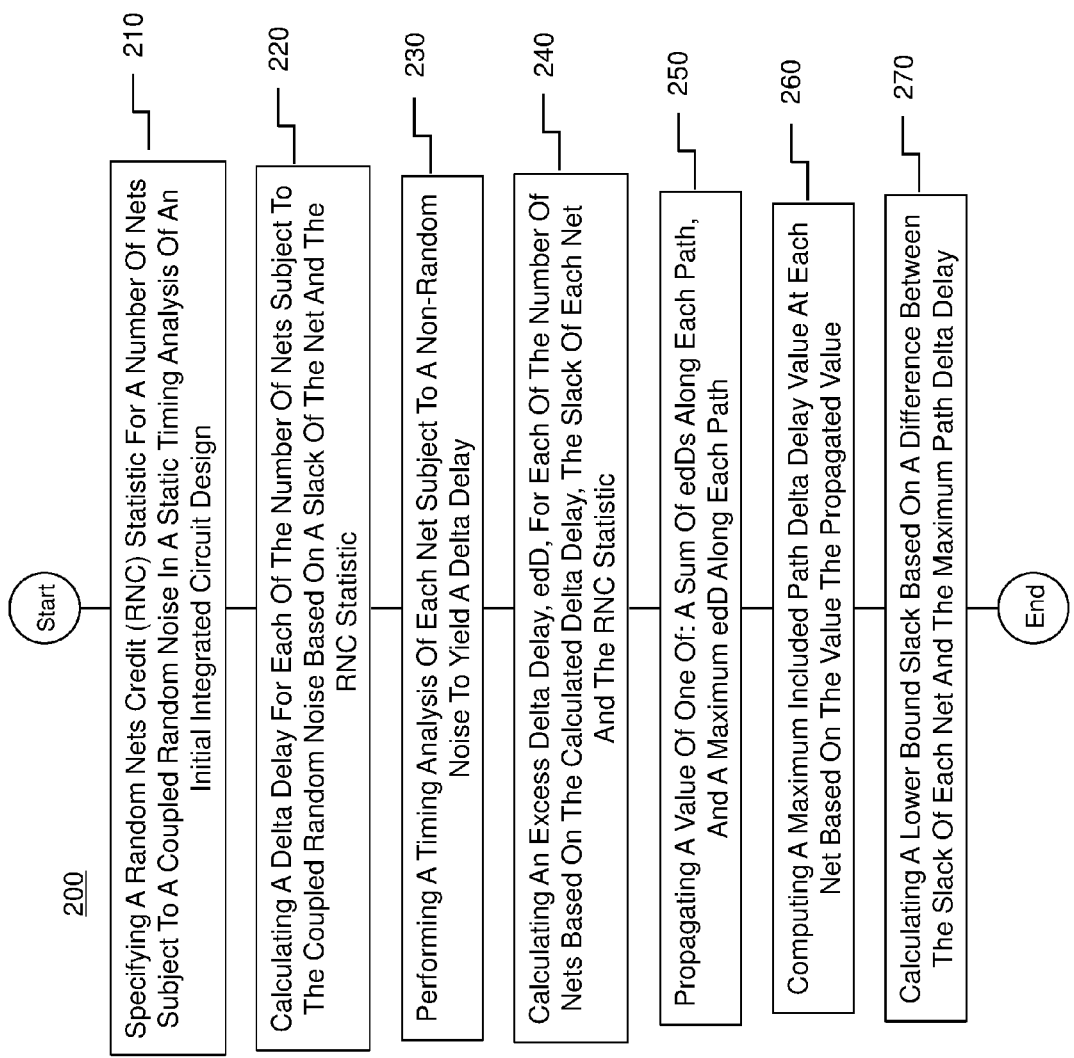
FIG. 2 is a flowchart diagram illustrating the calculation of slacks impacted by noise in a timing analysis of embodiments herein.

FIG. 2 illustrates an exemplary method 200 of performing a static timing analysis, using a random nets credit (RNC) method and a more computationally intensive timing analysis method, including: specifying a random nets credit (RNC) statistic for a number of nets subject to a coupled random noise in a static timing analysis of an integrated circuit (IC) 210; calculating a delta delay for each of the number of nets subject to the coupled random noise based on a slack of the net and the RNC statistic 220; performing a timing analysis of each net subject to a non-random noise to yield a delta delay 230; calculating an excess delta delay, edD, for each of said number of nets based on said calculated delta delay, said slack of each said net, and said RNC statistic 240; propagating a value of one of: a sum of edDs along each path and a maximum edD along each path 250; computing a maximum path delta delay at each of said number of nets based on said propagated value 260; and calculating a lower bound slack for each of said number of nets based on a difference between said slack of each said number of nets and said maximum path delta delay 270.

In the exemplary method, above, the RNC statistic may comprise a sum of a credit statistic based on the N largest delta delays of N nets and on how many of the N nets can switch at the same time, and of a root sum square of a credit statistic based on the M next largest delta delays of M nets and on how many of the M nets can switch at the same time, to define an RNC (N, M) statistic. In the exemplary method, above, the delta delay for each of the number of nets may be based on a slack for each of the number of nets divided by the RNC (N, M) statistic. In the exemplary method, above, the excess delta delay, edD, for each single net(X) may equal dD(X)−slack(X)/(N+sqrt(M)), where dD(X) equals a delta delay of net(X), slack(X) equals a slack of net(X) from a noise-free timing analysis including delta delays only for "always included" nets, and (N+sqrt(M)) equals the RNC (N, M) statistic. In the exemplary method, above, the propagating of the value of one of: the sum of edDs along each path and the maximum edD along each path may be defined by, sum_edD(X)=sum_fwd_edD(X)+sum_bck_edD(X)−edD(X), where a combination of forward and backward propagation of the sums of edDs occurs along each path, and max_edD(X)=max(max_fwd−edD(X), max_bck_edD(X)), where a combination of forward and backward propagation of the maximum edD occurs along each path, respectively.

In the exemplary method, above, the computing of the maximum path delta delay at each net(X) may be based on the propagated value comprising a smallest value of: max_path_dD(X)=max(slack,0)+max_edD(X)×(N+sqrt(M)); and max_path_dD(X)=max(slack,0)+sum_edD(X). The exemplary method, above, may further comprise using calculations of the lower bound slack for each net to adjust the initial IC design, to close timing, and to generate a final IC design.

The propagation of either the sum of edDs along each path or the maximum edD along each path may be both forward and backward, to see the worst sum of upstream and downstream information. The forward propagation of the maximum edD along each path may be represented by, max_fwd_edD(X)=max(edD(X), max_fwd_edD(all predecessors(X)), and the backward propagation of the maximum edD along each path may be represented by, max_bck_edD(X)=max(edD(X), max_bck_edD(all succcessors(X)).

While the combined forward and backward propagation of the maximum edD along each path may be represented by, max_edD(X)=max(max_fwd–edD(X), max_bck_edD(X)).

The forward propagation of the sums of edDs along each path may be represented by, sum_fwd_edD(X)=edD(X)+max(sum_fwd_edD(all predecessors(X))), and the backward propagation of the sums of edDs along each path may be represented by, sum_bck_edD(X)=edD(X)+max(sum_bck_edD(all successors(X))).

While the combined forward and backward propagation of the sums of edDs along each path may be represented by, sum_edD(X)=sum_fwd_edD(X)+sum_bck_edD(X)–edD(X).

The maximum path delta delay computation may use either the propagated max_edD(X) value or the propagated sum_edD(X) value, i.e., max_path_dD(X)=max(slack, 0)+max_edD(X)×(N+sqrt( M)), or max_path_dD(X)=max(slack, 0)+sum_edD(X), as both computations are bounds, where the smallest computed value may be used.

One may consider traversing a path from a lower slack region to a higher slack region. It follows that the higher slack region may accommodate more noise, i.e., a greater delta delay, without failing. That is, the higher slack region may absorb some of the excess delta delay propagated from the lower slack region. Following this scenario, when propagating an excess delta delay, edD, from a node or edge with slack, S1, to a node or edge with slack, S2, one may adjust the edD value to be consistent with S2. One may translate the max_path_dD(X) on the node or edge with slack S1 to a worst slack, wS1. The difference between the worst slack, wS1, for the source node or edge and the original slack, S2, for the destination node or edge may be determined. Thus, the slack difference may be converted to an equivalent maximum and/or sum path dD relative to S2.

Figure 3:
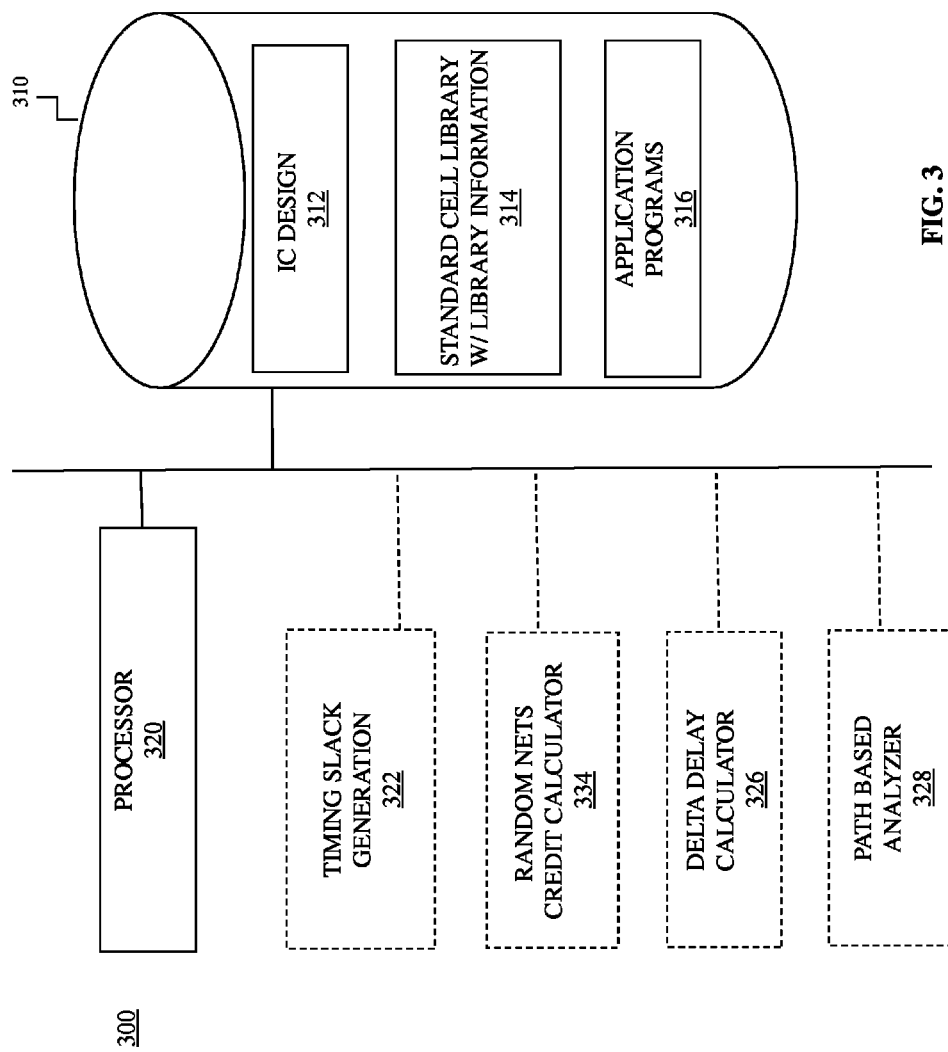
FIG. 3 is a schematic diagram illustrating a representative hardware environment for practicing embodiments herein.

A representative hardware environment for practicing the embodiments of the invention is depicted in FIG. 3. More particularly, the system 300 may perform a static timing analysis of an integrated circuit (IC) using a random nets credit (RNC) method to analyze a number of nets subject to a coupled random noise within the IC. The system 300 may comprise a computer system comprising a memory 310, e.g., at least one computer readable storage medium, such as a computer readable storage device. The memory 310 may store an IC design 312, a standard cell library 314 containing information on both active and passive electronic devices, and application programs 316 that comprise instructions and data. The system 300 may also comprise at least one processor 330 in communication with the memory 310. For example, the system 300 may comprise a single specialized processor 320 that in performing a static timing analysis of an IC may perform multiple application programs comprising instructions and data. Alternatively, the system 300 may comprise, for example, multiple specialized processors 322-328 that perform timing slacks generation 322, random nets credit (RNC) calculations 334, delta delay calculations 326, and path-based analyses 328.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
specifying a random nets credit (RNC) statistic for a number of nets subject to a coupled random noise in a static timing analysis of an initial integrated circuit (IC) design;
performing a static timing analysis of each net subject to non-random noise to yield a delta delay of said integrate circuit design;
calculating an upper bound for a delta delay of each of said number of nets using said RNC statistic;
identifying each of said number of nets with a delta delay that exceeds said upper bound;
identifying all nets including fan-in cones and fan-out cones of nets, connected to each of said number of nets that exceeds said upper bound for said delta delay;
performing a higher accuracy timing analysis, including any of: refined delta delay calculations and path-based analyses based on a physical design, for said all nets that are identified; and
closing said static timing analysis using calculations of the upper bound for each delta delay of each of the number of nets subject to the coupled random noise, the delta delay of each net subject to the non-random noise, and said higher accuracy timing for all the nets that are identified, to generate a final IC design.

2. The method of claim 1, said RNC nets statistic comprising a sum of a credit statistic based on the N largest delta delays of N nets and on how many of said N nets can switch at the same time, and of a root sum square of a credit statistic based on the M next largest delta delays of M nets and on how many of said M nets can switch at the same time, to define an RNC (N, M) statistic.

3. The method of claim 2, said calculating of said upper bound for said delta delay of each of said number of nets comprising dividing a corresponding slack of said each of said number of nets by said RNC (N, M) statistic.

4. The method of claim 1, said fan-in cones comprising all predecessor nets in a path from a source to each one of said number of nets with a delta delay that exceeds said upper bound, and said fan-out cones comprising all successor nets in a path from said each one of said number of nets with a delta delay that exceeds said upper bound to a sink.

5. The method of claim 1 further comprising, computing a delta delay for each net subject to a non-random noise in said IC design.

6. A method comprising:
specifying a random nets credit (RNC) statistic for a number of nets subject to a coupled random noise in a static timing analysis of an initial integrated circuit (IC) design;
performing a static timing analysis of each net subject to non-random noise to yield a delta delay of said integrate circuit design;
calculating a delta delay for each of said number of nets subject to said coupled random noise based on a slack of said net and said RNC statistic;
calculating an excess delta delay, edD, for each of said number of nets based on said calculated delta delay, said slack of each said net, and said RNC statistic;
propagating a value of one of: a sum of edDs along each path and a maximum edD along each path;
computing a maximum path delta delay value at each net based on said propagated value;
calculating a lower bound slack for each net based on a difference between said slack of each said net and said maximum path delta delay; and
closing said static timing analysis using the delta delay of each net subject to the non-random noise, and the calculations of a lower bound slack for each net based on said difference between said slack of each said net and said maximum path delta delay, to generate a final IC design.

7. The method of claim 6, said RNC statistic comprising a sum of a credit statistic based on the N largest delta delays of N nets and on how many of said N nets can switch at the same time, and of a root sum square of a credit statistic based on the M next largest delta delays of M nets and on how many of said M nets can switch at the same time, to define an RNC (N, M) statistic.

8. The method of claim 7, said delta delay for each of said number of nets being based on a slack for each said number of nets divided by said RNC (N, M) statistic.

9. The method of claim 6, said excess delta delay, edD, for each single net(X) equaling $dD(X)-slack(X)/(N+sqrt(M))$, where $dD(X)$ equals a delta delay of net(X), slack(X) equals a slack of net(X), and $(N+sqrt(M))$ equals said RNC (N, M) statistic.

10. The method of claim 9, said propagating said value of one of: said sum of edDs along each path and said maximum edD along each path being defined by, respectively, $max\_edD(X)=max(max\_fwd-edD(X), max\_bck\_edD(X))$, where a combination of forward and backward propagation of the maximum edD occurs along each path, and $sum\_edD(X)=sum\_fwd\_edD(X)+sum\_bck\_edD(X)-edD(X)$, where a combination of forward and backward propagation of the sums of edDs occurs along each path.

11. The method of claim 10, said computing of said maximum path delta delay at each said net(X) being based on said propagated value comprising a smallest value of:
$max\_path\_dD(X)=max(slack, 0)+max\_edD(X)\times(N+sqrt(M))$; and
$max\_path\_dD(X)=max(slack, 0)+sum\_edD(X)$.

12. A system, comprising:
a memory that stores an integrated circuit (IC) design; and
at least one processor that performs computer readable instructions to:
specify a random nets credit (RNC) statistic for a number of nets subject to a coupled random noise in a static timing analysis of said IC design;
perform a static timing analysis of each net subject to non-random noise to yield a delta delay of said IC design;
calculate an upper bound for a delta delay of each of said number of nets by a calculation using said RNC statistic;
identify each of said number of nets with a delta delay that exceeds said upper bound;
identify all nets including fan-in cones and fan-out cones of nets, connected to each of said number of nets that exceeds said upper bound for said delta delay; and
perform a higher accuracy timing analysis, including any of: refined delta delay calculations and path-based analyses based on a physical design, for said all nets that are identified; and
close said static timing analysis using calculations of the upper bound for each delta delay of each of the number of nets subject to the coupled random noise, the delta delay of each net subject to the non-random noise, and said higher accuracy timing for all the nets that are identified, to generate a final IC design.

13. The system of claim 12, said RNC statistic comprising a sum of a credit statistic based on the N largest delta delays of N nets and on how many of said N nets can switch at the same time, and of a root sum square of a credit statistic based on the M next largest delta delays of M nets and on how many of said M nets can switch at the same time, to define an RNC (N, M) statistic.

14. The system of claim 13, calculation of said upper bound for said delta delay of each of said number of nets comprising dividing a corresponding slack of said each of said number of nets by said RNC (N, M) statistic.

15. The system of claim 12, said fan-in cones comprising all predecessor nets in a path from a source to each one of said number of nets with a delta delay that exceeds said upper bound, and said fan-out cones comprising all successor nets in a path from said each one of said number of nets with a delta delay that exceeds said upper bound to a sink.

* * * * *